April 13, 1954

N. J. BUCK 2,674,837

POWER-OPERATED LAWN MOWER

Filed April 14, 1948

INVENTOR.
N. J. BUCK.

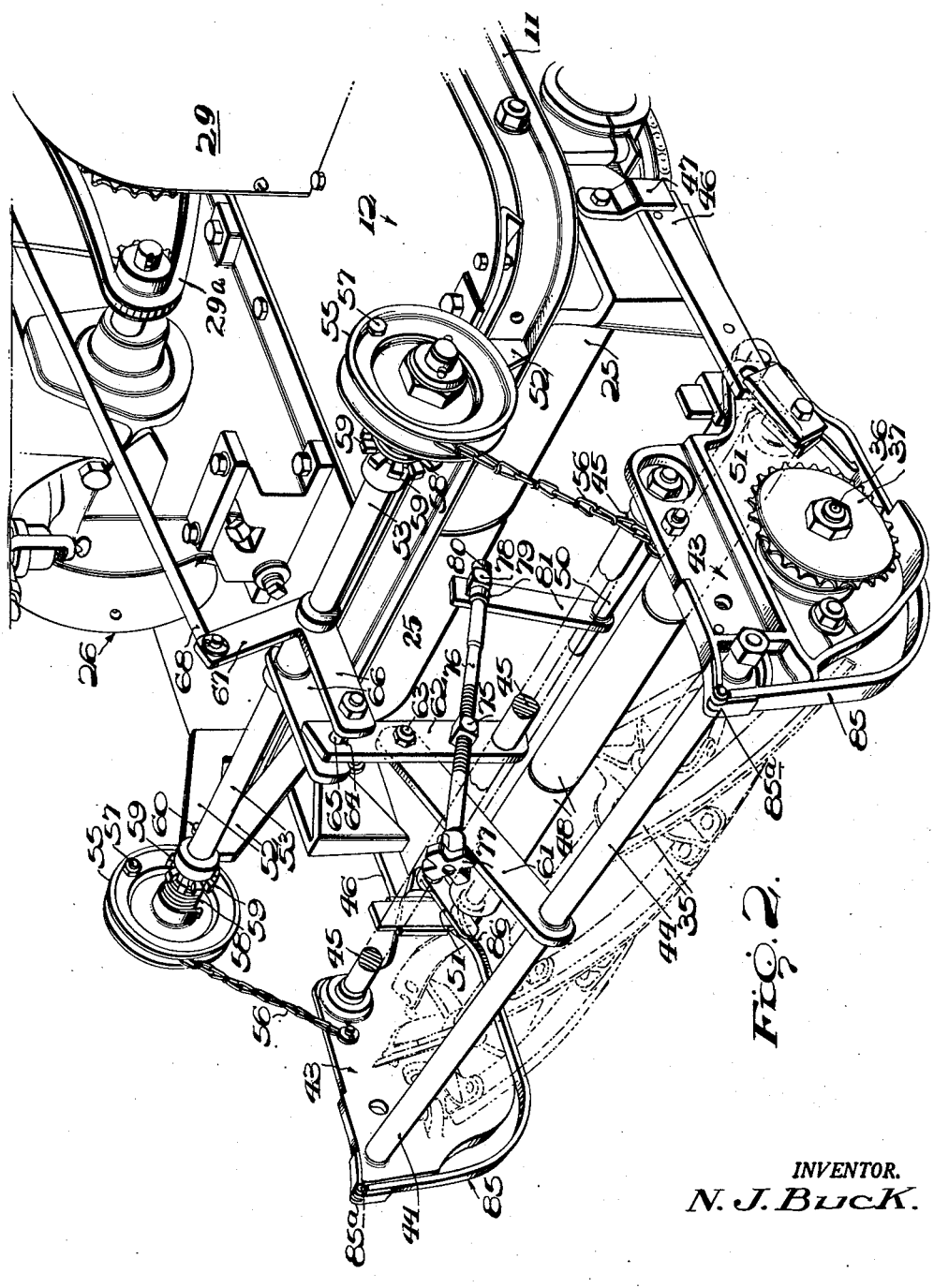

April 13, 1954            N. J. BUCK            2,674,837
POWER-OPERATED LAWN MOWER
Filed April 14, 1948                          3 Sheets-Sheet 3
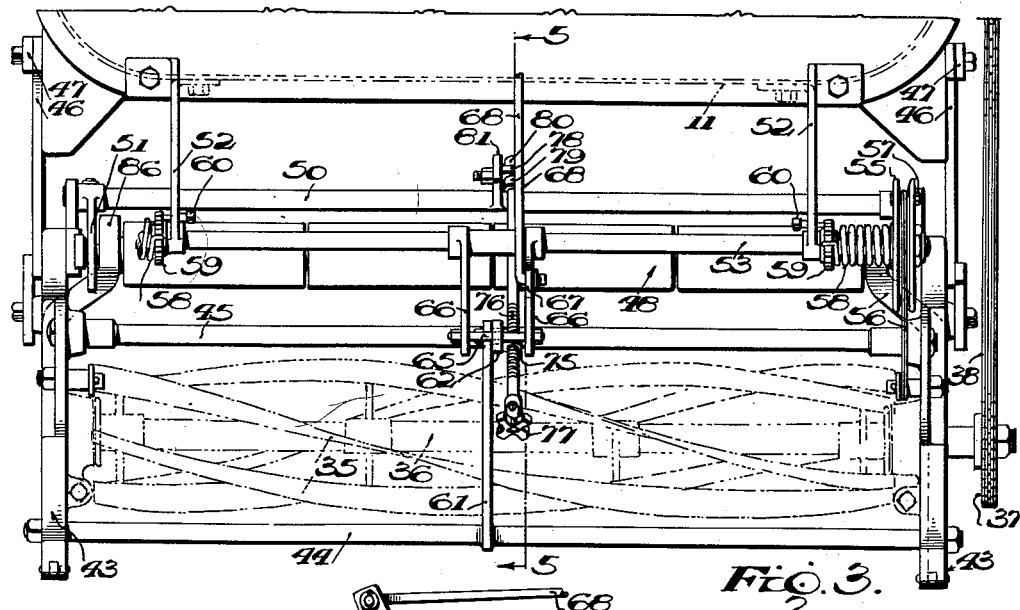
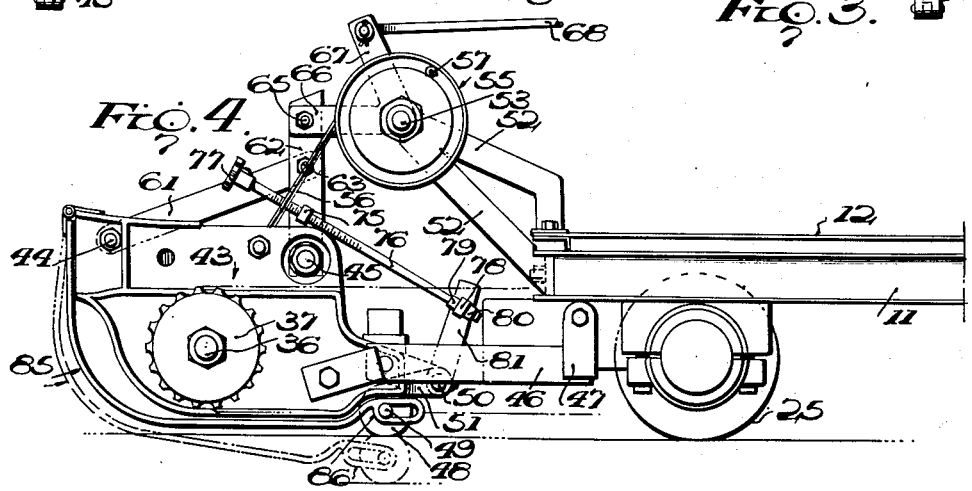
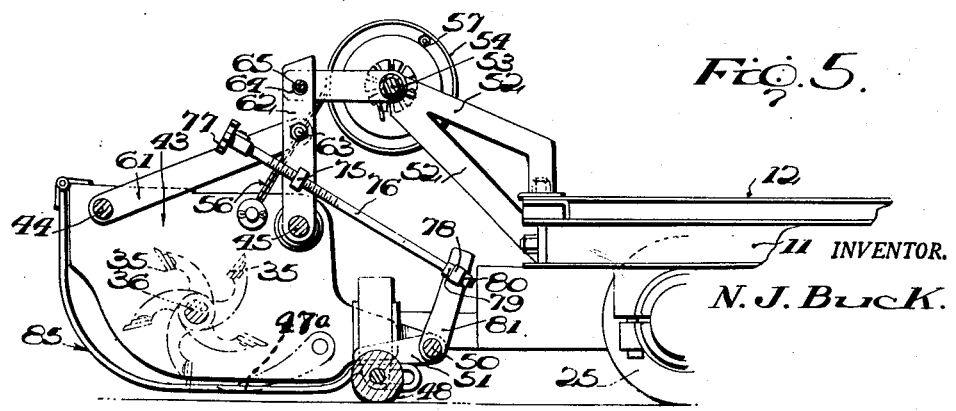
INVENTOR.
N. J. BUCK.

Patented Apr. 13, 1954

2,674,837

UNITED STATES PATENT OFFICE 2,674,837

POWER-OPERATED LAWN MOWER

Neafie J. Buck, Hicksville, N. Y.

Application April 14, 1948, Serial No. 20,901

13 Claims. (Cl. 56—26)

This invention relates to lawn mowers, especially power operated lawn mowers.

One of the principal objects of the invention is to provide a simple and easily operated mechanism for adjusting the height of cut of a mower unit without changing the angle of the stationary blade of the mower. Expressing the matter otherwise, the invention provides an adjustable mower unit whose stationary blade is always maintained parallel to the ground whatever its adjustment may be. The invention in its preferred embodiment is characterized by the use of a single hand screw for raising and lowering the mower unit to permit a minimum cut of one-half inch or a maximum cut of three inches, and thus is an important improvement over mower mountings which are so made that five or six bolts must be removed and replaced each time the same adjustment is made.

Another object is to provide a mounting for a mower unit at the forward end of a tractor which permits either end of the unit to rise, independently of the other end, or both ends simultaneously, without affecting the adjustment. In other words, the invention provides an improved "free floating" mower unit.

A further object is to provide a power-operated mower unit on which the operator may ride, which is so made that it turns in a circle of 36 in. or less, hence is highly maneuverable. Another object is to provide a wheel-less mower unit having guiding shoes which will not "scalp" or "skin" the turf, being so made that they will always clear the ground by at least half an inch. General objects are to provide a power mower which is easy to build and to operate and maintain, and is economical in fuel consumption, therefore meeting the demand for a power mower which is priced relatively low.

Further objects and advantages will appear in the following description of a preferred embodiment of the invention shown in the accompanying drawings forming a part of this specification.

In said drawings,

Fig. 2 is a perspective view on a larger scale showing the mower unit of my invention mounted on the front end of a tractor, most of which is omitted, the revolving blades and certain other parts being shown in phantom;

Fig. 3 is a top plan view of the mower unit of my invention showing the revolving blades in phantom and also showing the forward end only of the tractor;

Fig. 4 is a side elevation of the mower unit and part of the tractor, omitting the driving chain and showing the roller and an anti-scalping shoe in another position, indicated in phantom lines;

Fig. 5 is a sectional side elevation of the mower unit and part of the tractor, the revolving blades and the stationary blade of the unit being shown in phantom.

Figure 1:
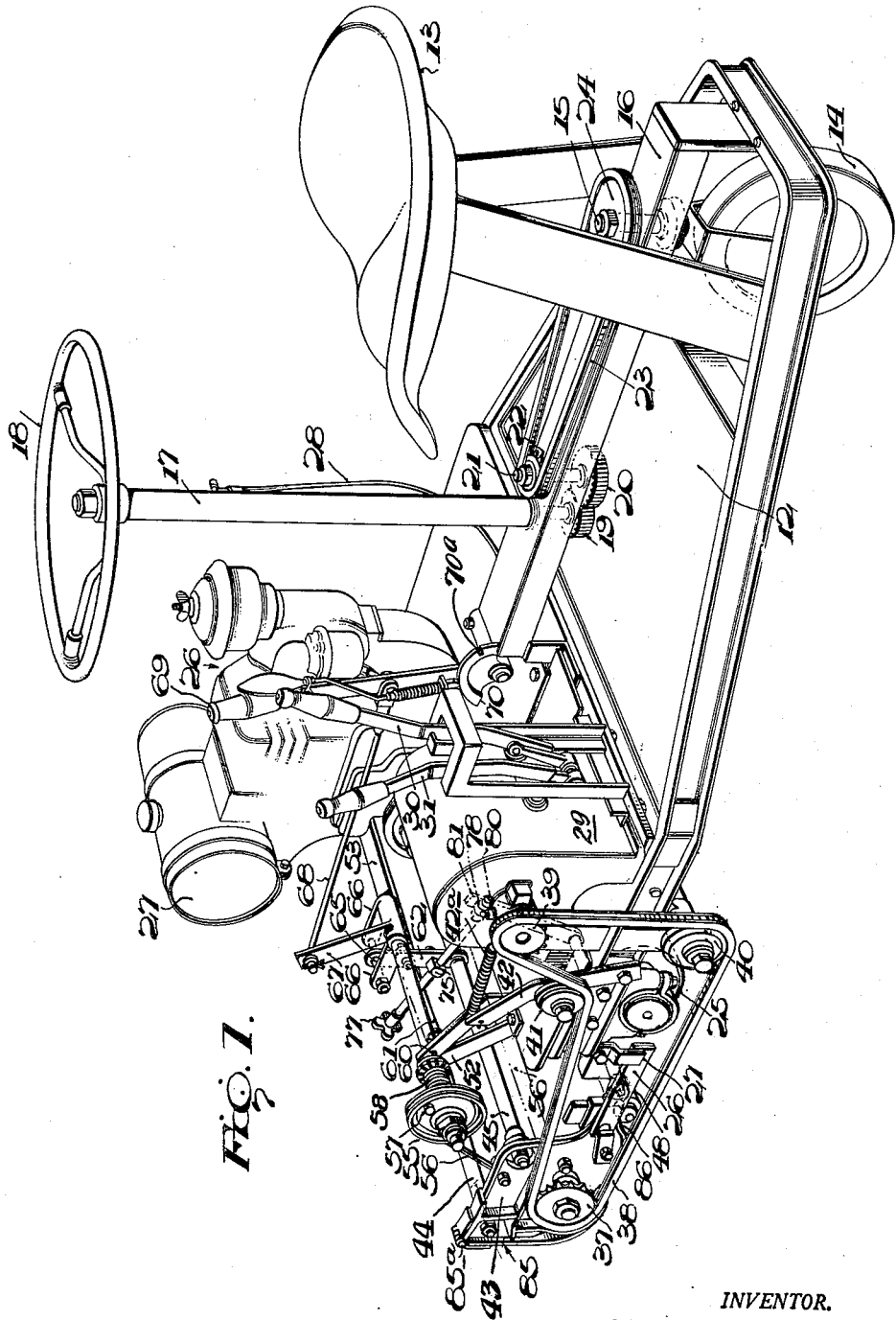
Fig. 1 is a perspective view of the power lawn mower of my invention, omitting minor details of no importance.

Referring particularly to the drawings, the improved lawn mower comprises a frame 11 preferably made principally of channel iron or aluminum alloy, with a platform 12 of sheet metal to support various parts as well as the feet of the operator, who sits in a seat 13 fixed at the rear end of the machine. A swiveled ground wheel 14, preferably having a rubber tire with a 4 in. tread and an 8 in. diameter, is mounted to turn on the axis of the vertical swivel shaft 15, said shaft being journaled in a horizontal bridging member 16 welded or otherwise secured at its ends to the extreme rear end of the frame and to the platform 12. The bridging member also provides a support for the steering column 17 of the steering wheel 18, which the operator grasps while sitting in seat 13. A gear 19 fixed to the lower end of the steering shaft turns a gear 20 fixed to a shaft 21 which is supported on bridging member 16. A sprocket wheel 22 is fixed to the upper end of shaft 21 and a sprocket chain 23 meshes with sprocket 22 and also with a sprocket 24 fast to swivel shaft 15. Thus turning of steering wheel 18 to the right or clockwise causes the swiveled ground wheel to turn in such a way that the mower swings to the right (assuming that the power drive is engaged).

Propulsion of the machine is effected through a power-driven differential roller 25 which may be a steel roller having two sections each of about ten inches diameter, each driven through a differential (not shown) by an internal combustion engine 26 provided with a fuel tank 27, both supported on the platform 12. The engine may be a 2 H. P. motor for a 25 in. motor unit, or a 6 H. P. motor for a 30 in. mower unit. A fuel control lever is mounted on the steering column 17 within easy reach of the operator's right hand and is connected to the fuel intake of the engine by the usual wire 28. A clutch and reversing unit 29, preferably protected by a sheet metal housing as shown, is supported on platform 12 near the engine, being driven by a sprocket chain 29a (Fig. 2) from the power shaft of the engine. Clutch and reversing gear unit 29 is a dual unit, and has a right hand lever 30 for controlling the drive of the differential roller 25 and a left hand lever 31 for controlling the drive to the mower unit, that is, the flow of power to the revolving blades of the mower unit. Still another lever permits the operator to reverse the direction of rotation of the differential roller, hence allows backing of the machine whenever desired. As is well known in the art, the differential roller permits steering of the machine because either of its sections may remain stationary while the other is power driven. The distance between the bearing line of the differential roller 25 and the swivel axis of the rear swiveled wheel 14 is preferably 34 in.; this is the turning radius of the machine.

The preferred mower unit has five revolving spiral blades 35 secured to a common shaft 36 (not fully shown) one of whose ends has a sprocket wheel 37 fixed thereon. A sprocket chain 38 drives sprocket wheel 37 and is in turn driven by a sprocket wheel 39 on the shaft of the clutch and gear unit 29. A chain-guiding pulley 40 and a chain-tightening pulley 41 are also shown, the latter being on a pivoted arm 42 which is constantly urged against the chain 38 by a tension spring 42a. When the clutch is engaged through the left hand lever 31, shaft 36 will be rotated to whirl the revolving mower blades at a speed determined by the speed of the engine; this will take place whether the machine is traveling or is stationary. The mower unit has no ground wheels at the side, merely the usual end plates 43 tied together by a pair of horizontal tie rods 44, 45. A pair of arms 46 are pivoted at their rear ends to brackets 47 fixed to the machine frame, while at their forward ends they are pivoted to end plates 43. These arms transmit the thrust or push of the tractor to the mower unit as a whole, whatever the cutting adjustment may be. The stationary blade against which the revolving blades 35 move to cut the grass is shown at 47a, Fig. 5. As there are no wheels on the mower unit, the blades or knives of the unit are the first elements which the grass encounters; thus there is no flattening of uncut grass by wheels as with other mowers, both power and hand-propelled.

To support the mower unit while cutting grass, a horizontal roller 48 is employed which has either three or four sections mounted on a common spindle 49 for ease in turning. Directly back of roller 48 is a horizontal rock shaft 50 whose ends are received in bearings on extensions of the end frames or plates 43 of the mower unit. Short arms 51 are welded on rock shaft 50 and at their free ends are secured by set screws or the like to the ends of spindle 49. Vertical or cutting adjustment of the mower unit is effected by oscillating horizontal rock shaft 50, which swings arms 51 to raise or lower roller 48 thereby to lower or raise the stationary blade relative to the ground.

To assist in supporting the mower unit, a spring suspension is provided which has the twofold advantage of decreasing the weight on roller 48 and enhancing the ease of elevating the mower unit by a hand lever to be described. At the forward end of platform 12 a pair of brackets 52 are welded or otherwise secured. A horizontal rock shaft 53 extends across the front of the machine and is journaled in brackets 52. Fixed to the ends of the rock shaft are a pair of grooved sheaves 55. Chains 56 (or if desired, heavy wires) are fastened by bolts 57 to the sheaves, are partly wrapped around the same, and extend down to a connection with the end frames 43 of the mower unit. A torsional spring 58 is connected at one end to each sheave 54 or 55 and is mounted on the rock shaft 53. To the other end of each torsional spring a serrated nut 59 is connected so that when turned in one direction it winds up the spring and when turned in the other it lessens the tension of the spring. A pin 60, which passes through a small bore in either bracket 62, engages one of the notches of the adjacent serrated nut to hold the tension of the spring. The result is that about one-half or perhaps two-thirds of the weight of the mower unit is carried by the chains 56, which means that the roller 48 rides lightly over the grass and further that the mower unit is easily lifted by manual power as will now be explained.

Secured to tie rod 44 is a fixed link 61. Another fixed link 62 is secured to and extends upwardly from tie rod 45 and is connected by bolt 63 to the end of arm 61. Thus link 62 is immovable. At its upper end link 62 has a bore 64 for loosely receiving a bolt 65 which extends between two parallel arms 66 of a bell crank lever which is welded or otherwise fixed to rock shaft 53. The other arm 67 of the bell crank lever extends at an angle of less than 90° to arms 66 and has a pivotal connection with a rod 68 which extends rearwardly to a hand lever 69 directly in front of the steering column 17, and hence within easy reach of the operator. The hand lever 69 moves over a quadrant 70 with a single notch 70a (Fig. 1) for engagement by the spring-pressed dog on the lever when the lever is pulled far back to lift the mower unit. The reaction of an unevenness in the ground, or an object such as a tree root, may lift either end of the mower unit independently of the other end, and when one end is raised, the chain at that end is wound up on its sheave automatically, while the bell crank lever is swung upwardly and rearwardly, causing rod 68 and hand lever 69 to move rearwardly. When this end-lifting occurs, link 62 moves freely along bolt 65, perhaps until it strikes one of the arms 66. The movement of link 62 is always toward the end of the mower unit which has not been lifted. This independent lifting of the ends of the mower unit responsive to ground conditions may amount to as much as three or four inches. Arms 66 act as stops to limit the lifting permitted.

At an intermediate point on link 62 a nut 75 is swiveled. A screw-threaded rod 76 with a knob 77 on one end is threaded through nut 75. Preferably the threads on rod 76 are twelve to the inch, or even coarser. The lower or rear end of the rod 76 engages a member 78 but is not threaded therein, a pair of collars 79, 80 preventing any relative movement of rod 76 and member 78. Member 78 is swiveled on a lever 81 fixed to the horizontal rock shaft 50 which raises and lowers roller 48 as described. When knob 77 is rotated by hand in one direction it turns the screw or rod 76 which moves through nut 75 in one direction or the other and swings lever 81 in one direction or the other to raise or lower roller 48 thereby to increase or decrease the elevation of the stationary blade of the mower unit. In an actual embodiment of the invention it was found that this raising or lowering was easily effected, and that the cutting-height adjustment so made maintained the stationary blade always parallel to the ground, as is highly desirable. Thus the angle of attack of the blade is not changed by vertical adjustment of the mower unit. Furthermore this vertical adjustment in no way interferes with the independent lifting of either end of the mower (just described) nor with the operator-controlled lifting of the mower unit as a whole when the mower unit should be well clear of the ground, as when traveling over terrain (such as a roadway) which is not to be mowed.

At the forward upper corners of the end plates 43 curved shoes 85 are hinged as at 85a. These shoes act as guides when mowing. The lower, rear ends 86 of shoes 85 are connected to the spindle 49 of roller 48, so that as the roller is raised and lowered, the ends of the shoes rise and sink with it. I term shoes 85 "anti-scalping" shoes because no matter how tender the grass, they will not "skin" the turf or leave bare streaks after mowing. These shoes are preferably made so as to clear the ground by at least half an inch.

The invention provides a lawn mower which is highly maneuverable, is of low height and small overall dimensions so that it may travel under low trees or close to obstructions, is economical to build and to operate and maintain, is readily adjusted for different cutting heights and when so adjusted always has the stationary blade parallel to the ground, and is so made that none of the grass is flattened without being cut.

Obviously the present invention is not limited to the particular embodiment herein shown and described.

Having described one form which the invention may assume, what I claim as new and desire to secure by Letters Patent of the United States of America is:

1. A power lawn mower having a frame; an operator's seat supported on the frame; a motor supported on the frame; a differential ground-engaging roller comprising two sections and located beneath the forward end of the frame; a clutch and gear unit driven by the motor and located on the frame; mechanisms under the manual control of the operator for delivering power to the differential roller to propel the lawn mower forwardly or rearwardly or in curved paths; a swiveled ground wheel under the frame generally below the operator's seat; a steering wheel supported on the frame; mechanical connections between the steering wheel and the swiveled ground wheel permitting the operator to steer the lawn mower through the swiveled ground wheel working in co-operation with the differential roller; a wheel-less mower unit located forward of the forward end of the frame; said mower unit having end plates which are tied together, spiral blades secured to a shaft and revolving between the end plates, a stationary blade against which the spiral blades move in shearing relation, a roller engaging the ground and providing the sole ground-engaging part of the mower unit, and a pair of parallel arms each pivoted at one end to the frame and at the other end to an end plate so that the mower unit may be pushed by the power lawn mower, the mounting and dimensions of the mower unit being such that it will cut all the grass in front of the differential roller; and mechanism controllable by the operator to deliver power from the motor to the shaft of the revolving blades of the mower unit.

2. The invention defined in claim 1, wherein the mower unit is adjusted for height of cut of the grass by means of a single hand screw, and mechanism connected with the ground-engaging roller of the mower unit which is actuated by said single hand screw, said mechanism maintaining the stationary blade parallel to the ground and its angle of attack unchanged whatever its adjustment, said hand screw and the co-operating mechanism being constructed and arranged so as to hold all adjustments without change during operation of the mower unit.

3. A mounting for lawn mower units at the forward ends of tractors consisting of means pivotally tying the unit to the tractor so as to be pushed thereby, operator-controlled means for lifting the unit, and means carried on the tractor and connected to the unit and adapted to take part of the weight of the unit off the ground, said last-named means consisting of a pair of sheaves mounted on the tractor, torsion springs independently acting on the sheaves, flexible elements adapted to be automatically wound on the sheaves by the reaction of the torsion springs and being secured to the mower unit at their ends.

4. A mower unit mounting for tractors comprising a rigid member fixed to the mower unit, a nut swiveled on the rigid member, a screw threaded through the nut and having a handle on one end, a swingable arm engaged by the screw so as to swing when the screw is turned by means of its handle, a rock shaft to which said arm is fixed, a pair of short arms fixed to the rock shaft, said short arms engaging the spindle of the roller of the mower unit to raise or lower said roller thereby to adjust the height of cut of the grass, the rigid member being a link assemblage fixed to the center of the mower unit and extending above the same, and a bell crank lever having two parallel arms with a bolt extending between them, said bolt passing through a larger bore in the upper end of a link forming a part of said link assemblage, means on the tractor to support said bell crank lever to swing in a vertical plane, and operator-controlled means to swing said bell crank lever to raise or lower the mower unit as a whole.

5. A free-floating mounting on the forward end of a tractor or the like for a wheel-less lawn mower unit having a stationary blade and revolving blades moving against the stationary blade in shearing relation, said mounting including parallel arms pivoted to the lawn mower unit and to the forward end of tractor and adapted to push the lawn mower unit as well as to tie it to the tractor, operator-actuated mechanism for lifting the unit so that its entire weight is supported by the tractor, said mechanism including elements which permit independent rise of either end of the unit responsive to unevenness in the ground surface; said unit having a ground-engaging roller constituting the sole ground-contacting element of the unit; and a mechanism including a single operator-turned screw for adjustment of the cut of the unit by adjustment of said ground-engaging roller, said screw when turned manually raising or lowering the stationary blade of the mower unit; the parallelism of the stationary blade and its angle of attack relative to the ground remaining the same in all adjusted positions of said ground-engaging roller.

6. In a lawn mower having a roller and end plates but no ground wheels, a pair of anti-scalping shoes each hinged at the upper end to the upper front part of the end plate of the mower and having a connection at the rear end with the spindle of the lawn mower roller, said roller being the single element which has direct contact with the ground.

7. In a lawn mower unit having a roller, a stationary blade or knife, revolving knives, and a frame including end plates, an anti-scalping shoe arranged forwardly or in advance of each end plate and hinged thereto at the upper front corner thereof, both anti-scalping shoes being normally out of contact with the ground, and means connecting the lower rear end of each shoe to the end of the spindle of the roller.

8. The invention as set forth in claim 7 wherein the mower unit has no ground wheels and means are provided to adjust the cutting height of the stationary blade by operator-controlled mechanism regulating the position of the roller, the ends of the shoes then rising and lowering with the roller.

9. A power lawn mower including a mobile tractor having a source of power; a wheel-less mower unit including a stationary blade, a set of revolving blades moving in shearing relation to the stationary blade, means for driving the revolving blades from the source of power, and a ground-engaging roller constituting the sole ground-engaging element of the mower unit; a pair of parallel arms pivoted to the forward end of the tractor and to the mower unit and serving both to push the mower unit over the ground and to tie said unit to the tractor; a lever on the tractor connected by a linkage with the mower unit and permitting lifting of the mower unit off the ground; said linkage including a bell crank lever pivotally mounted to swing on a horizontal axis adjacent the forward end of the tractor, said bell crank lever having two well spaced parallel arms which are substantially horizontal when the mower unit is on the ground, a bolt extending horizontally between the spaced parallel arms of the bell crank lever adjacent the outer ends of said arms, a substantially vertical member rigidly fixed to and extending upwardly above the mower unit in a plane substantially midway between the ends of the mower unit, said substantially vertical member having a bore larger than said bolt and said bolt passing through said bore, so that the mower unit may be lifted by swinging said lever; the arrangement being such that whenever the mower unit is lifted or lowered at one end only by an unevenness in the ground surface traversed by it, the substantially vertical member fixed on the mower unit will move toward one of the spaced parallel arms of the bell crank lever until finally it is stopped by contact with said arm, the two arms thus acting as stops preventing further tilting of the mower unit; and manually operable means mounted on the mower unit for moving the ground-engaging roller of the mower unit up or down to adjust the height of cut of the grass without changing the angle of attack or parallelism of the stationary blade of the mower unit.

10. The invention defined in claim 9, wherein the manually operable means for adjusting the ground-engaging roller comprises a single hand screw, a nut supported on the substantially vertical member, the hand screw being threaded through said nut, and a linkage engaged by the hand screw and coupled with the spindle of the ground-engaging roller, so that turning of the hand screw will raise or lower the ground-engaging roller relative to the stationary blade.

11. A power lawn mower having a frame supporting a seat for the operator; a mower on the frame; a differential ground-engaging roller at the forward end of the frame; clutch-controlled mechanism to deliver power from the motor to the differential roller to propel the lawn mower forwardly or rearwardly or in curved paths; steering means for the lawn mower; a wheel-less mower unit having revolving blades, a stationary blade, a roller back of the stationary blade and constituting the sole ground-engaging part of the mower unit, and means connecting the unit pivotally with the front end of the frame so that the unit is pushed by the lawn mower; clutch-controlled mechanism to deliver power from the motor to the revolving blades of the mower unit; the mounting and dimensions of the unit being such that it will cut all the grass in front of the power-driven differential roller; a mechanism including a single hand screw and operated by manual turnings of said screw for raising and lowering the height of the stationary blade, said hand screw being constructed and arranged so as to hold by itself the adjustment of the mechanism for raising and lowering said stationary blade, said mechanism being such that the blade is maintained substantially parallel to the ground in all of its adjusted positions and its angle of attack is unchanged whatever its adjusted position; the hand screw being located above the mower unit in a convenient position for the operator, said hand screw being supported in a downwardly and rearwardly inclined position and having its lower end connected with a lever, said lever being fixed to a horizontal rockshaft which has its ends received in bearings, said bearings being supported on the end plates of the mower unit, short arms being fixed to said rock-shaft and being secured at their free ends to the ends of a spindle, said spindle supporting the ground-engaging roller of the mower unit.

12. A wheel-less lawn mowing attachment for self-propelled tractors having power take-off means, said mowing attachment including a frame, a set of revolving blades supported by the frame, a stationary blade with which the revolving blades co-act, a ground-engaging roller back of the stationary blade, said roller constituting the sole ground-contacting element of the mowing attachment, and pivotal means for linking the frame of the mowing attachment with the front end of the tractor; a single hand-operable screw carried by a nut which is in turn carried by said frame; and mechanism supported by said frame and connected to said ground-engaging roller and operated by manual turning of said screw to raise or lower the axis of rotation of said roller relative to the stationary blade, thereby to vary the height of cut of said stationary blade without altering the angle of attack or parallelism of said stationary blade.

13. The invention defined in claim 12 wherein the frame of the mowing attachment has a member fixed centrally thereto and extending upwardly therefrom, and operator-actuated means are adapted to be supported by the tractor and are connected with the upper end of said central member, said operator-actuated means being operable to lift the entire mowing attachment off the ground; the connection between the operator-actuated means and said centrally-fixed member being such that the mowing attachment, when supported by its roller on the ground, may rock transversely of the tractor in a vertical plane to follow uneven ground contours.

References Cited in the file of this patent

UNITED STATES PATENTS

| Number | Name | Date |
| --- | --- | --- |
| 2,032,784 | Worthington | Mar. 3, 1936 |
| 2,192,468 | Gore | Mar. 5, 1940 |
| 2,197,264 | Cooper | Apr. 16, 1940 |
| 2,299,859 | Speiser | Oct. 27, 1942 |
| 2,313,590 | Sherer, Jr., et al. | Mar. 9, 1943 |
| 2,340,849 | Wildboor et al. | Feb. 8, 1944 |
| 2,505,879 | Blydenburgh | May 2, 1950 |